United States Patent
Park

[11] Patent Number: 5,872,708
[45] Date of Patent: Feb. 16, 1999

[54] AUTOMATIC POLARITY CONVERSION CIRCUIT

[75] Inventor: Jeong-Joo Park, Pusan, Rep. of Korea

[73] Assignee: LG Semicon Co., Ltd., Cheongju, Rep. of Korea

[21] Appl. No.: 848,469

[22] Filed: May 8, 1997

[30] Foreign Application Priority Data

May 11, 1996 [KR] Rep. of Korea ..................... 96-15703

[51] Int. Cl.⁶ ..................................................... H02M 7/02
[52] U.S. Cl. ................................................ 363/63; 361/82
[58] Field of Search ............................... 363/63; 307/127; 361/76, 77, 82, 84; 320/165, DIG. 15

[56] References Cited

U.S. PATENT DOCUMENTS 5,612,859  3/1997  Kakalec et al. ........................... 363/63

*Primary Examiner*—Peter S. Wong
*Assistant Examiner*—Y. J. Han

[57] ABSTRACT

An automatic polarity conversion circuit for providing output signals having predetermined output polarities. The automatic polarity conversion circuit includes first and second input terminals for receiving first and second input signals, respectively. Also included is a converter converting the first and second input signals into first and second output signals having predetermined first and second output polarities, respectively, regardless of the polarities of the first and second input signals. Further, a first output terminal outputs the first output signal, and a second output terminal outputs the second output signal.

12 Claims, 1 Drawing Sheet

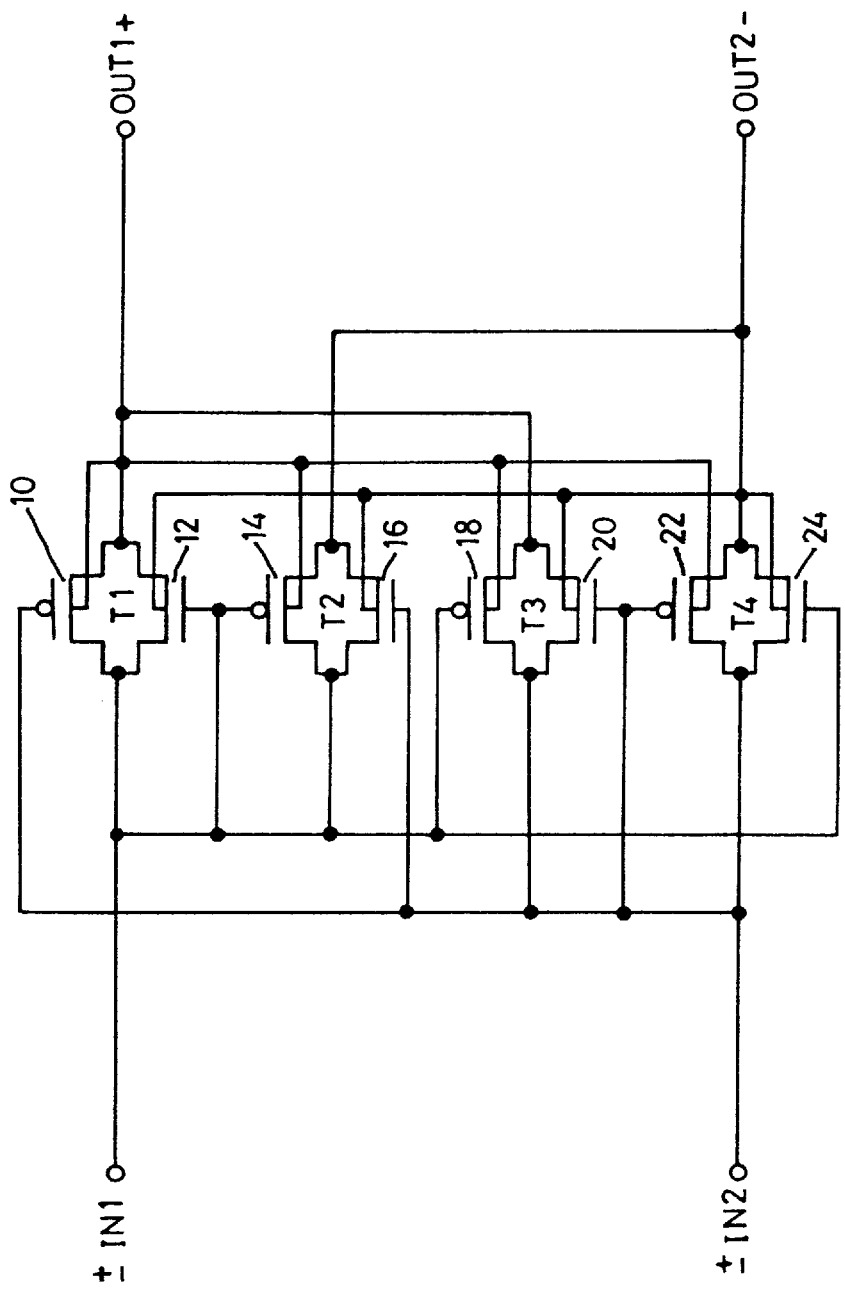

AUTOMATIC POLARITY CONVERSION CIRCUIT

BACKGROUND OF THE INVENTION

1. Field of the Invention

The present invention relates to an automatic polarity conversion circuit, and more particularly, to an automatic polarity conversion circuit which outputs signals having a predetermined polarity regardless of the polarity of the received signals.

2. Discussion of Related Art

Generally, portable electronic devices such as, e.g., a radio set, a cellular phone, or a beeper use a battery as a power source. In such electronic devices, the battery is to be inserted with its polarities matching with the positive terminal (+) and negative (−) terminal of the power supply input.

However, if by mistake, the battery is inserted with the polarities (+) and (−) inverted in the electronic device, the inverted battery may, e.g., cause internal circuits to operate improperly, shorten the life of the electronic device, or damage the electronic device.

SUMMARY OF THE INVENTION

Accordingly, the present invention is directed to an automatic polarity conversion circuit that substantially obviates one or more of the problems due to limitations and disadvantages of the related art.

An object of the present invention is to provide an automatic polarity conversion circuit which, e.g., prevents internal circuits of an electronic device from operating improperly, prevents a shortened life of the electronic device, or prevents damage of the electronic device.

Another object of the present invention is to output signals having a predetermined polarity regardless of the polarity of received signals.

To achieve these and other advantages and in accordance with the purpose of the present invention, as embodied and broadly described, an automatic polarity conversion circuit in accordance with the present invention comprises a first input terminal for receiving a first input signal, the first input signal having a first polarity; a second input terminal for receiving a second input signal, the second input signal having a second polarity; a converter converting the first and second input signals into first and second output signals having predetermined first and second output polarities, respectively; a first output terminal for outputting the first output signal; and a second output terminal for outputting the second output signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawing which is given by way of illustration only, and thus is not limitative of the present invention, and wherein:

FIG. 1 is a circuit diagram of an automatic polarity conversion circuit according to the present invention.

DETAILED DESCRIPTION OF THE PREFERRED EMBODIMENT

Reference will now be made in detail to the preferred embodiment of the present invention, examples of which are illustrated in the accompanying drawing.

Referring to FIG. 1, the preferred embodiment of the automatic polarity conversion circuit of the present invention comprises first, second, third, and fourth transmission gates T1, T2, T3 and T4.

The first through fourth transmission gates T1–T4 each comprise a P-MOS transistor and a N-MOS transistor. Specifically, the first transmission gate T1 comprises a first P-MOS transistor 10 and a first N-MOS transistor 12 connected together. The second transmission gate T2 comprises a second P-MOS transistor 14 and a second N-MOS transistor 16 connected together. The third transmission gate T3 comprises a third P-MOS transistor 18 and a third N-MOS transistor 20 connected together. The fourth transmission gate T4 comprises a fourth P-MOS transistor 22 and a fourth N-MOS transistor 24 connected together.

The first through fourth transmission gates T1–T4 have input ports that are connected to either a first or second input terminal IN1 or IN2 and have output ports that are connected either to a first or second output terminal OUT1 or OUT2. Specifically, first and second input terminals IN1 and IN2 are connected to the input ports of the first and second transmission gates T1 and T2 and to the input ports of the third and fourth transmission gates T3 and T4, respectively.

Also, the first input terminal IN1 is connected to the gates of the first N-MOS transistor 12, fourth N-MOS transistor 24, second P-MOS transistor 14, and third P-MOS transistor 18. The second input terminal IN2 is connected to the gates of the first P-MOS transistor 10, second N-MOS transistor 16, third N-MOS transistor 20, and fourth P-MOS transistor 22.

When a positive terminal (+) of a power source is connected to the first input terminal IN1, the first input terminal IN1 receives a first signal having a positive polarity (+). Also, when a negative terminal (−) of the power source is connected to the second input terminal IN2, the second input terminal IN2 receives a second signal having a negative polarity (−)

Thus, the first signal having a positive polarity (+) is applied to the gates of the first N-MOS transistor 12, fourth N-MOS transistor 24, second P-MOS transistor 14, and third P-MOS transistor 18. Also, the second signal having a negative polarity (−) is applied to the gates of the first P-MOS transistor 10, second N-MOS transistor 16, third N-MOS transistor 20, and fourth P-MOS transistor 22.

In addition, the first signal having a positive polarity (+) is applied to the inputs of the first and second transmission gates T1 and T2; and the second signal having a negative polarity (−) is applied to the inputs of the third and fourth transmission gates T3 and T4.

By this arrangement, the first and fourth transmission gates T1 and T4 are "ON". A transmission gate is "ON" when a signal having a positive polarity (+) is applied to the gate of its N-MOS transistor or a signal having a negative polarity (−) is applied to the gate input of its P-MOS transistor; otherwise, the transmission gate is "OFF". Specifically, the first signal having a positive polarity (+) is applied to the gates of the first and fourth N-MOS transistors 12 and 24 of the first and fourth transmission gates T1 and T4, respectively. The second signal having a negative polarity (−) is applied to the gates of the first and fourth P-MOS transistors 10 and 22 of the first and fourth transmission gates T1 and T4, respectively.

Conversely, the second and third transmission gates T2 and T3 are "OFF". The second transmission gate is "OFF" because the first signal having a positive polarity (+) is applied to the gate of the second P-MOS transistor 14, and second signal having a negative polarity (−) is applied to the gate of the second N-MOS transistor 16. The third transmission gate T3 is "OFF" because the first signal having a positive polarity (+) is applied to the gate of the third P-MOS transistor 18, and the second signal having a negative polarity (−) is applied to the gate of the third N-MOS transistor 20.

Thus, because the first transmission gate T1 is "ON", the first signal having a positive polarity (+), is transferred through the first transmission gate T1 to the first output terminal OUT1. Also, because the fourth transmission gate T4 is "ON", the second signal having a negative polarity (−) is transferred through the fourth transmission gate T4 to the output terminal OUT2. Therefore, the first output terminal OUT1 outputs a first output signal having a positive polarity (+) and the second output terminal OUT2 outputs a second output signal having a negative polarity (−).

But, when a negative terminal (−) of the power source is connected to the first input terminal IN1, the first input terminal IN1 receives a first signal having a negative polarity (−). Also, when a positive terminal (+) of the power source is connected to the second input terminal IN2, the second input terminal IN2 receives a second signal having a positive polarity (+).

Thus, the first signal having a negative polarity (−) is applied to the gates of the first N-MOS transistor 12, fourth N-MOS transistor 24, second P-MOS transistor 14, and third P-MOS transistor. The second signal having a positive polarity (+) is applied to the gates of the first P-MOS transistor 10, second N-MOS transistor 16, third N-MOS transistor 20, and fourth P-MOS transistor 22.

In addition, the first signal having a negative polarity (−(−) is applied to the inputs of the first and second transmission gates T1 and T2. Also, the second signal having a positive polarity (+) is applied to the inputs of the third and fourth transmission gates T3 and T4.

As a result of this arrangement, the second and third transmission gates T2 and T3 are "ON". Specifically, the second transmission gate T2 is "ON" because the first signal having a negative polarity (−) is applied to the gate of the second P-MOS transistor 14, and the second signal having a positive polarity (+) is applied to the gate of the second N-MOS transistor 16. The third transmission gate T3 is "ON" because the first signal having a negative polarity (−) is applied to the gate of third P-MOS transistor 18, and the second signal having a positive polarity (+) is applied to the gate of the third N-MOS transistor 20.

Conversely, the first and fourth transmission gates T1 and T4 are "OFF". Specifically, the first transmission gate T1 is "OFF" because the first signal having a negative polarity (−) is applied to the gate of the first N-MOS transistor 12, and the second signal having a positive polarity (+) is applied to the gate of the first P-MOS transistor 10. The fourth transmission gate T4 is "OFF" because the first signal having a negative polarity (−) is applied to the gate of the fourth N-MOS transistor 24, and the second signal having a positive polarity (+) is applied to the gate of the fourth P-MOS transistor 22.

Because the second transmission gate. T2 is "ON", the first signal having a negative polarity (−), is transferred to the second output terminal OUT2. Also, because the third transmission gate is "ON", the second signal having a positive polarity (+), is transferred to the first output terminal OUT1. Thus, the first output terminal OUT1 outputs a first output signal having a positive polarity (+) and the second output terminal OUT2 outputs a second output signal having a negative polarity (−).

As demonstrated above, the first and second output terminals OUT1 and OUT2 always output signals having a positive polarity (+) and a negative polarity (−), respectively. This is a result of having first, second, third and fourth transmission gates T1, T2, T3 and T4, selectively driven.

As described in the above, the first through fourth transmission gates T1–T4 are selectively driven by the first and second signals received by the first and second input terminals IN1 and IN2, respectively. Because of this arrangement, the first and second output terminals OUT1 and OUT2 always output first and second output signals each having a predetermined polarity regardless of the polarity of the first and second signals received by the first and second input terminals IN1 and IN2, respectively.

Accordingly, an advantage of the present invention is to, e.g., prevent internal circuits of an electronic device from operating improperly, prevent a shortened life of an electronic device, or prevent damage of the electronic device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic polarity conversion apparatus, comprising:

a first input terminal for receiving a first input signal, the first input signal having a first polarity;

a second input terminal for receiving a second input signal, the second input signal having a second polarity;

a converter converting the first and second input signals into first and second output signals having predetermined first and second output polarities, respectively, said converter including, a first transmission gate having a first P-MOS transistor and a first N-MOS transistor connected together, the first transmission gate having an input port connected to the first input terminal and an output port connected to the first output terminal, a gate of the first N-MOS transistor being connected to the first input terminal, a gate of the first P-MOS transistor being connected to the second input terminal, a second transmission gate having a second P-MOS transistor and a second N-MOS transistor connected together, the second transmission gate having an input port connected to the first input terminal and an output port connected to the second output terminal, a gate of the second N-MOS transistor being connected to the second input terminal, and a gate of the second P-MOS transistor being connected to the first input terminal, a third transmission gate having a third P-MOS transistor and a third N-MOS transistor connected together, the third transmission gate having an input port connected to the second input terminal and an output port connected to the first output terminal, a gate of the third N-MOS transistor being connected to the second input terminal, and a gate of the third P-MOS transistor being connected to the first input terminal, and a fourth transmission gate having a fourth P-MOS transistor and a fourth N-MOS transistor connected together, the fourth transmission gate having an input port connected to the second input terminal and an output port connected to the second output terminal, a gate of the fourth N-MOS transistor being connected to the first input terminal, and a gate of the fourth P-MOS transistor being connected to the second input terminal;

a first output terminal for outputting the first output signal; and a second output terminal for outputting the second output signal.

2. The apparatus of claim 1, wherein the predetermined first and second output polarities are a positive polarity (+) and a negative polarity (−), respectively.

3. The apparatus of claim 2, wherein the first and second input polarities are a positive polarity (+) and a negative polarity (−), respectively.

4. The apparatus of claim 2, wherein the first and second input polarities are a negative polarity (−) and a positive polarity (+), respectively.

5. The apparatus of claim 1, wherein the first and second input terminals receive first and second power source signals from a power source, the first power source signal has one of a positive polarity (+) and a negative polarity (−) and, respectively, the second power source signal has one of a negative polarity (−) and positive polarity (+).

6. The apparatus of claim 5, wherein the power source is a battery.

7. A method of automatically converting input signal polarities to predetermined output signal polarities, comprising the steps of:

receiving a first input signal, the first input signal having a first polarity;

receiving a second input signal, the second input signal having a second polarity;

transferring the first input signal to a first output terminal as a first output signal using a first transmission gate, which includes a first P-MOS transistor and a first N-MOS transistor connected together, when the first input signal has a positive polarity (+);

transferring the first input signal to a second output terminal as a second output signal using a second transmission gate, which includes a second P-MOS transistor and a second N-MOS transistor connected together, when the first input signal has a negative polarity (−);

transferring the second input signal to the first output terminal as the first output signal using a third transmission gate, which includes a third P-MOS transistor and a third N-MOS transistor connected together, when the second input signal has a positive polarity (+); and transferring the second input signal to the second output terminal as the second output signal using a fourth transmission gate, which includes a fourth P-MOS transistor and a fourth N-MOS transistor connected together, when the second input signal has a negative polarity (−).

8. The method of claim 7, wherein the predetermined first and second output polarities are a positive polarity (+) and a negative polarity (−), respectively.

9. The method of claim 8, wherein the first polarity of the first input signal is a positive polarity (+) and the second polarity of the second input signal is a negative polarity (−).

10. The method of claim 8, wherein the first polarity of the first input signal is a negative polarity (−) and the second polarity of the second input signal is a positive polarity (+).

11. The method of claim 7, wherein the receiving the first input signal step receives a first power input signal having one of a positive polarity (+) and a negative polarity (−) from a power source; and the receiving the second input signal step receives a second power signal having one of a negative polarity (−) and positive polarity (+) from the power source.

12. The method of claim 11, wherein the power source is a battery.

* * * * *